UNITED STATES PATENT OFFICE.

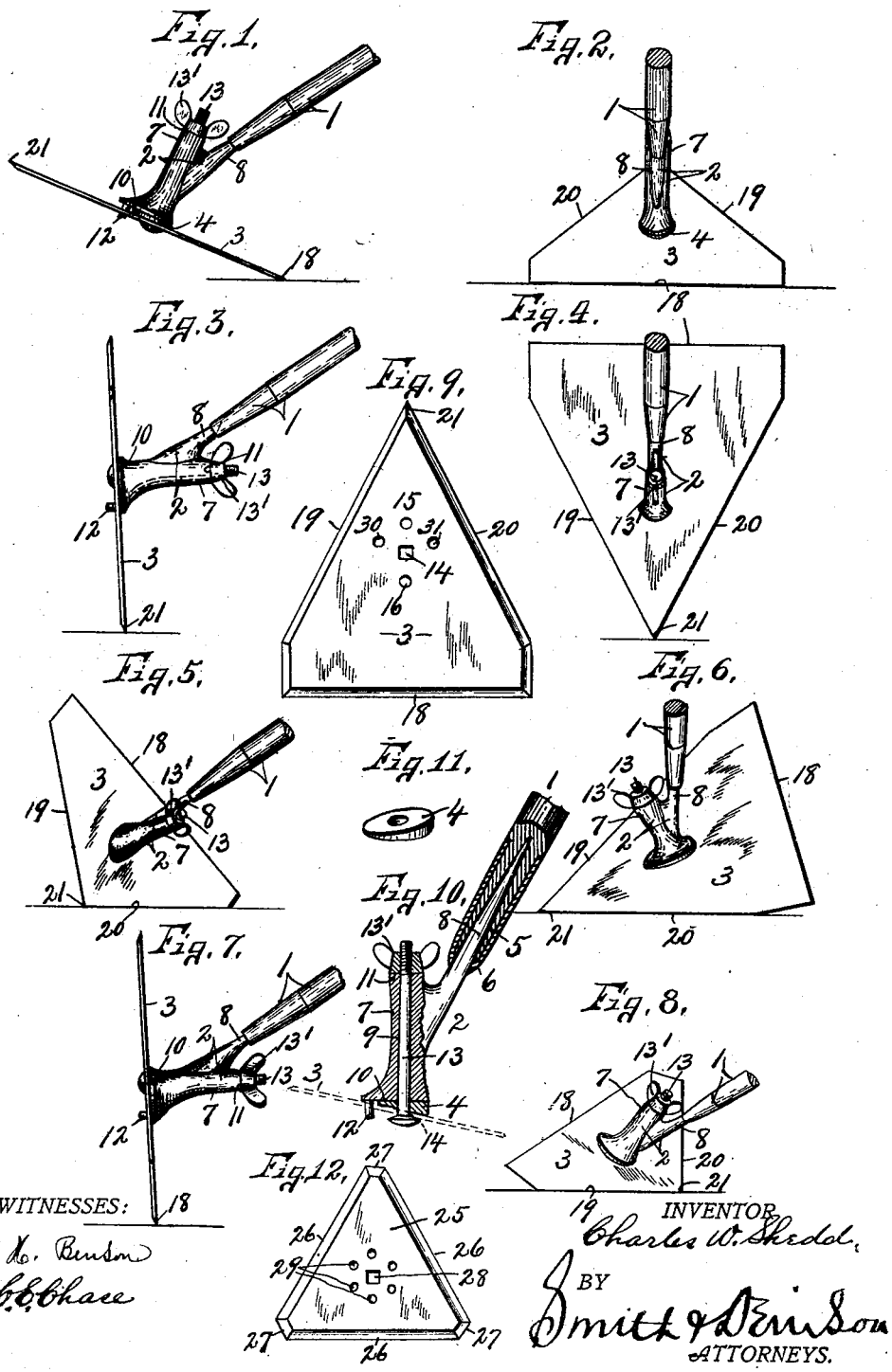

CHARLES W. SHEDD, OF CANASTOTA, NEW YORK.

TOOL OR IMPLEMENT.

SPECIFICATION forming part of Letters Patent No. 718,534, dated January 13, 1903.

Application filed September 6, 1901. Serial No. 74,482. (No model.)

*To all whom it may concern:*

Be it known that I, CHARLES W. SHEDD, of Canastota, in the county of Madison, in the State of New York, have invented new and useful Improvements in Tools or Implements, of which the following, taken in connection with the accompanying drawings, is a full, clear, and exact description.

My invention relates to improvements in tools and implements; and it consists in the novel manner of adjustably connecting a handle to a tool.

The objects of this invention are to improve the method of attachment of handles to tools, to permit change in position of the blade or working portion of a tool with reference to the handle, and to make the device as simple, compact, and inexpensive as possible.

More specifically and with reference to the use of my invention in garden implements and the like, it is my object to adapt a simple and compact instrument for a variety of uses—such as hoeing, weeding, hilling, ridging and drill-marking, and the like—and also to permit the use of dissimilar garden or lawn tools in connection with a suitable handle for different kinds of work and to adjust the same at will at different planes or angles relative to the ground-line or to the line of draft, and to permit the use of either the points or edges of a multisided tool at will and at angles best suited for the work to be done.

In the accompanying drawings I illustrate the application of my invention to a garden implement of the general nature of a hoe.

In the drawings, Figures 1 and 2 show side and rear elevations of such an implement, the handle being partly broken away and the tool-blade being shown in position for "straight-cut" weeding. Figs. 3 and 4 are views similar to Figs. 1 and 2, the blade being shown, however, in position for "drill-marking," the hereinafter-mentioned beveled washer having been removed. Figs. 5 and 6 show side and rear views of the implement, which is shown in the position for "hilling" or "ridging," to the left of the line of draft. Figs. 7 and 8 show side and rear views of the implement, Fig. 7 showing the blade in position for ordinary hoeing and Fig. 8 showing said blade in position for left-hand "draw-cut" weeding. Fig. 9 is a detail view of one form of blade. Fig. 10 is a detail view of the clamping-head and end of the handle, a portion of said head and a portion of the handle being shown in the section. Fig. 11 shows an isometric view of the beveled washer. Fig. 12 is a detail view of a blade of slightly different form from that shown in Fig. 9, having the shape of an equilateral triangle.

In the drawings, 1 designates a handle connected to a clamping-head 2, to which a blade 3 or other suitable tool may be connected, and between this blade or tool and the clamping-head there may be a beveled member or washer 4, the latter being employed to adjust and vary, as desired, the angle of such tool or blade with respect to the handle.

The handle 1 may be of any desired size, form, or construction, usually consisting of an elongated rod or dowel having one end provided with a lengthwise socket 5 and a ferrule 6, the socket being adapted to receive the shank on the clamping-head presently described, and the ferrule 6 serving to prevent the splitting of or injury to the handle 1.

The clamping-head 2 is preferably formed of metal, such as cast or malleable iron, and is provided with a hollow body 7 and a shank 8. Suitable means are provided for attaching said head to a tool. To this end the head 7 may be formed with a lengthwise opening 9 and opposite end bearing-faces 10 and 11, the lengthwise opening 9 being extended entirely through the body 7 from end to end and disposed at any angle with the shank 8, and consequently at an angle with the handle 1, it being understood that the axis of the shank is substantially coincident with the axis of the handle.

The opposite end bearing-faces of the hollow body 7 are preferably disposed at substantially right angles with the lengthwise opening 9, the bearing-face 10 being provided with a stud or projection 12, arranged at one side of the opening 9 and adapted to enter apertures formed in the working tool presently described.

It has been previously stated that the lengthwise opening 9 is disposed at an angle with the axis of the handle 1, this angle being preferably other than a right angle and the bearing-face 10 being at right angles with the axis of the opening 9. It is apparent that said bearing-face is also disposed at an angle with the axis of the handle other than a right angle. This bearing-face 10 is adapted to receive and support the tool 3, which is held in position by a clamping-bolt 13, also presently described.

In Figs. 1, 2, and 10 I have shown the beveled washer 4 as interposed between the bearing-face 10 and the working tool 3, said washer being provided with an aperture for receiving the adjacent end of the bolt 13 and being adapted to be rotated upon said bolt for the purpose of varying the angle of the tool 3 relative to the ground-line and to the axis of the handle.

The tool 3 is provided with a substantially central angular aperture 14 and additional apertures 15 and 16, arranged at opposite sides of the central aperture 14. This angular opening 14 is adapted to receive an angular portion upon the head of the bolt 13, and the apertures 15 and 16 are arranged to receive the stud or shoulder 12 of the clamping-head 2. Although I have shown and described the bearing-face 10 as disposed at right angles with the bolt-opening 9 it is evident that said bearing-face may be disposed in a plane at an angle other than a right angle, if desired.

The bolt 13 is provided at one end with a suitable head of greater area than the aperture 14 for engaging the lower face of the working tool 3, the opposite end of said bolt being extended through and beyond the bearing-face 11 and being provided with screw-threads adapted to receive a suitable nut arranged to engage the bearing-face 11 for drawing the head of the bolt against the tool 3, and thereby holding said tool in position. It is understood that when the beveled member 4 is employed this clamping-bolt serves to clamp both the tool 3 and member 4 in position. The stud 12 being at one side of the clamping-bolt 13 and entering one of the apertures 15 and 16 it is evident that the tool 3 is prevented from rotation upon the handle.

For use as a hoe or the like I preferably employ a multisided hoe-blade in connection with the head 2, and in Figs. 1 to 9, inclusive, I have shown one such blade having the working edges 18 19 20 and a working point 21. It is evident that other forms of tool may be used—as, for instance, that seen in Fig. 12, in which I have shown a substantially equilateral triangular plate 25, having working sides 26 and working points 27.

The tool 3 is adjustably mounted upon the head 2 in such manner that either of the working edges may be presented to the ground in substantially the same plane, or, in other words, at the same angle with the axis of the handle 1, or by simply rotating the handle upon its axis the different working edges of the tool may be presented to the ground at different angles—as, for instance, in Figs. 1 to 6, inclusive, I have shown the tool 3 as secured to the head 2, with the stud 12 registered with the aperture 15, which permits the implement to be used for a variety of purposes by simply turning the handle upon its axis—as, for instance, in Figs. 1 and 2, I have shown the handle at a definite angle relative to the ground-line, with the tool disposed at the proper angle for straight-cut weeding—that is, the straight edge 18 of the tool is presented to the ground with the body of the tool disposed at an acute angle with the ground-line—while in Figs. 3 and 4 the tool is simply inverted by rotating the handle for presenting the point 21 to the ground in the proper position for drill-marking without varying the angle of inclination of the handle.

In Figs. 5 and 6 the handle is rotated substantially a quarter-turn, so as to bring one of the working edges, as 20, substantially coincident with the ground-line, as used in left-hand ridging or hilling—that is, in hilling to the left of the line of draft. In like manner by simply rotating the handle a quarter-turn from the position seen in Fig. 1 in the opposite direction the working edge 19 may be employed for hilling or ridging to the right of the line of draft of the implement.

When it is desired to use my improved implement for draw-cut weeding, I preferably release the tool by unscrewing the nut 13' and move the tool so as to bring the aperture 15 out of registration with the stud 12, whereupon the tool is rotated with the bolt 13 until the aperture 16 is registered with said stud 12. The tool 3 is then again clamped in position by means of the bolt 13 and nut 13', whereupon the working edge 18 may be used for ordinary hoeing, as seen in Fig. 7, or one of the edges, as 19 or 20, may be employed for right or left hand draw-cut weeding by simply rotating the handle, as seen in Fig. 8, or if desired to use the point 21 of the tool at an acute angle with the ground-line it is simply necessary to rotate the handle a half-revolution from the position seen in Fig. 7—as, for instance, in weeding very closely to plants or between narrow drill-rows of vegetables. This point is also adapted for weeding lawns and similar uses.

It will be understood upon reference to the foregoing description and the accompanying drawings that when it is desirable to work the various sides of the tool at the same angle relatively to the ground-line it is simply necessary to loosen the tool and to rotate the same upon its axis and to reclamp the same when in the proper position, and when it is desired to use the various working edges at different angles it is simply necessary to rotate the handle. It is also apparent that if it is desired to change the angle or inclination of the working tool this may be effected by loosening the clamping-bolt 13, then rotating the washer to the desired position, and then reclamping the parts in their adjusted position by means of the bolt 13 and nut 13'.

In the form of tool seen in Fig. 12 I have shown an angular substantially central aperture 28 and a series of surrounding apertures 29, the aperture 28 being arranged to receive the bolt 13 and the apertures 29 being adapted to receive the stud 12, so that either side 26 or point 27 may be brought to the work at the same angle with the ground-line. For the same purposes apertures 30 and 31 may be formed in the plate or tool 3.

The operation of my invention will now be readily understood upon reference to the foregoing description and the accompanying drawings, and it will be noted that the specific form of working blade or tool may be changed without departing from the spirit of this invention and that, if desired, said tool may be otherwise secured to the clamping-head 2 than by the bolt 13 and nut 13'.

It will be observed that different blades or tools may be attached to the clamping-head by unscrewing the nut 13', removing the bolt 13, and substituting the desired blade and attaching it by means of said bolt and nut.

Having thus described my invention, what I claim, and desire to secure by Letters Patent, is—

1. A clamping-head, for tools and implements, consisting of a head having a lengthwise aperture for the reception of a clamping-bolt, and a handle-shank projecting from said head and disposed at an angle to the bolt-aperture thereof.

2. In an implement, the combination with a clamping-head having a lengthwise bolt-aperture, and a handle connected therewith and disposed at an angle, other than a right angle, with reference to said aperture; of a tool, and a clamping-bolt engaged therewith and with said head, and passing through the aperture of the latter.

3. In an implement, the combination with a clamping-head having a lengthwise aperture, and a stud projecting from said head and located to one side of said aperture; of a clamping-bolt passing through said aperture, a tool held thereby to said head, said tool having a series of apertures, into which said stud may enter, and a handle connected to said head, but disposed at an angle, other than a right angle, with reference to the clamping-bolt.

4. In an implement, the combination with a clamping-head having means for connecting a handle thereto, and having also a stud arranged to engage a series of apertures in a tool; of a multisided tool, adapted for a connection to said head and having apertures for reception of said stud, disposed to permit the sides or the points of said tool to be brought into use, and a handle connected to said head.

5. An implement comprising a clamping-head having a lengthwise aperture and a handle disposed at an angle, other than a right angle, with each other, a tool engaged with the head and a clamping-bolt inserted in the aperture and engaged with the tool for the purpose described.

6. An implement comprising a clamping-head having a lengthwise opening and a handle-engaging member disposed at an angle other than a right angle with the opening, said clamping-head having one of its end faces disposed at substantially right angles with the aperture and provided with a stud projecting therefrom, a tool having an aperture alined with the former opening and with a series of additional apertures at one side of the former aperture, the latter apertures being registered with the stud, and a clamping-bolt passed through the former aperture of the tool and the lengthwise opening in the clamping-head and provided with a nut engaging the opposite end face of said head for drawing the tool into engagement with the former end face.

7. In an implement, a clamping-head having diverging handle and tool-engaging members, one of the end faces of the head being disposed at substantially right angles to the axis of the tool-engaging member, a tool mounted on said tool-engaging member, and a beveled washer interposed between said end face of the head and the tool and adapted to be rotated on the tool-engaging member, for changing the angle of the tool without removing said parts from the clamping-head.

In witness whereof I have hereunto set my hand this 4th day of September, 1901.

CHARLES W. SHEDD.

Witnesses:
H. E. CHASE,
JESSIE M. HAMMEKEN.